United States Patent [19]

Lee et al.

[11] Patent Number: 5,955,396
[45] Date of Patent: *Sep. 21, 1999

[54] MORPHOLOGY-CONTROLLED OLEFIN POLYMERIZATION CATALYST FORMED FROM AN EMULSION

[75] Inventors: Sam S. Lee, Cumming; Mary K. Trost; Steven A. Cohen, both of Alpharetta, all of Ga.

[73] Assignee: BP Amoco Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,397

[22] Filed: Jul. 17, 1996

Related U.S. Application Data

[60] Provisional application No. 60/005,338, Oct. 17, 1995.
[51] Int. Cl.$^6$ ....................................................... C08F 4/64
[52] U.S. Cl. ............................ 502/111; 502/104; 502/120; 502/125; 502/127; 526/124.3
[58] Field of Search ..................................... 502/111, 120, 502/125, 127; 526/124.3

[56] References Cited

U.S. PATENT DOCUMENTS

| | | | |
|---|---|---|---|
| 4,293,673 | 10/1981 | Hamer et al. | 526/88 |
| 4,315,874 | 2/1982 | Ushida et al. | 264/5 |
| 4,399,054 | 8/1983 | Ferraris et al. | 252/429 |
| 4,442,276 | 4/1984 | Kashiwa et al. | 526/125 |
| 4,469,648 | 9/1984 | Ferraris et al. | 264/9 |
| 4,487,846 | 12/1984 | Bailly et al. | 502/154 |
| 4,490,475 | 12/1984 | Bailly et al. | 502/156 |
| 4,511,703 | 4/1985 | Bailly | 526/125 |
| 4,530,915 | 7/1985 | Esneault et al. | 502/115 |
| 4,540,679 | 9/1985 | Arzoumanidis et al. | 502/111 |
| 4,612,299 | 9/1986 | Arzoumanidis et al. | 502/104 |
| 4,673,662 | 6/1987 | Bailly | 502/115 |
| 4,804,798 | 2/1989 | Albizzati | 585/512 |
| 4,866,022 | 9/1989 | Arzoumanidis et al. | 502/120 |
| 5,188,999 | 2/1993 | Duranel et al. | 502/111 |
| 5,223,466 | 6/1993 | Lee et al. | 502/120 |
| 5,227,354 | 7/1993 | Karayannis et al. | 502/113 |
| 5,346,972 | 9/1994 | Duranel et al. | 526/125 |

*Primary Examiner*—David W. Wu
*Attorney, Agent, or Firm*—Wallace L. Oliver

[57] ABSTRACT

A solid, hydrocarbon-insoluble, olefin-polymerization catalyst component having substantially uniform particles useful in polymerizing olefins is formed by:

reacting a magnesium-containing compound with carbon dioxide or sulfur dioxide;

forming a two-phase mixture of the resulting magnesium-containing compound with a suitable liquid hydrocarbon-miscible phase and a suitable polar solvent phase;

forming particles by adding the two-phase mixture after vigorous agitation to a liquid hydrocarbon; and contacting the formed particles at least once with a transition metal halide in the presence of an electron donor.

20 Claims, No Drawings

MORPHOLOGY-CONTROLLED OLEFIN POLYMERIZATION CATALYST FORMED FROM AN EMULSION

CROSS REFERENCE TO RELATED APPLICATIONS

This application claims benefit under 35 USC 119(e) of U.S. Provisional Application No. 60/005,338 filed Oct. 17, 1995.

BACKGROUND OF THE INVENTION

This invention relates to a catalyst component and a catalyst system which is useful for the stereoregular polymerization or copolymerization of alpha-olefins and more particularly concerns a magnesium-containing supported titanium-containing catalyst component which has superior morphology and which is formed as a precipitate from an emulsion.

Use of solid, transition metal-based, olefin polymerization catalyst components is well known in the art including such solid components supported on a metal oxide, halide or other salt such as widely-described magnesium-containing, titanium halide-based catalyst components. Such catalyst components commonly are referred to as "supported." Although many polymerization and copolymerization processes and catalyst systems have been described for polymerizing or copolymerizing alpha-olefins, an important practical consideration of preparing a catalyst component is the complexity of the preparation steps including minimization of waste streams which are created in the catalyst component manufacturing process. Consideration must be made to minimize waste solvent volume and use of certain solvents or diluents which require special environmental handling such as aromatic hydrocarbons.

Numerous individual processes or process steps have been disclosed to produce improved supported, magnesium-containing, titanium-containing, electron donor-containing olefin polymerization or copolymerization catalysts. For example, Arzoumanidis et al., U.S. Pat. No. 4,866,022, incorporated by reference herein, discloses a method for forming an advantageous alpha-olefin polymerization or copolymerization catalyst or catalyst component which involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor.

Arzoumanidis et al., U.S. Pat. No. 4,540,679, incorporated by reference herein, discloses a process for the preparation of a magnesium hydrocarbyl carbonate by reacting a suspension of a magnesium alcoholate in an alcohol with carbon dioxide and reacting the magnesium hydrocarbyl carbonate with a transition metal component.

Arzoumanidis et al., U.S. Pat. No. 4,612,299, incorporated by reference herein, discloses a process for the preparation of a magnesium carboxylate by reacting a solution of a hydrocarbyl magnesium compound with carbon dioxide to precipitate a magnesium carboxylate and reacting the magnesium carboxylate with a transition metal component.

Emulsions of magnesium chlorides solubilized in alcohols have been used to prepare olefin polymerization catalyst components in U.S. Pat. No. 4,399,054 and European Published Application EP 0 433 105.

In addition to catalyst yield and stereospecificity, polymer or copolymer morphology often is critical and typically depends upon catalyst morphology. Good polymer morphology generally involves uniformity of particle size and shape, resistance to attrition and an acceptably high bulk density. Minimization of very small particles (fines) typically is very important especially in gas-phase polymerizations or copolymerizations in order to avoid transfer or recycle line pluggage. Therefore, it is highly desirable to develop alpha-olefin polymerization and copolymerization catalysts and catalyst components that have good morphology, and in particular, an acceptable particle size. Another property which is important commercially is the maintenance of an acceptably high bulk density.

The purpose of this invention is to create a supported propylene polymerization catalyst system incorporating internal electron donors which shows superior polymerization activity while maintaining acceptable stereoregularity and other properties such as polymer bulk density and particle size distribution. A purpose of this invention is to produce a particulate solid catalyst component with a round morphology and typically larger particle sizes than otherwise comparably prepared material. Another purpose is to create a solid, particulate catalyst component which will produce polymer particles with improved flowability, especially for medium and high impact propylene copolymers. Another purpose of this invention is to manufacture solid catalyst components without creating large quantities of undesirable waste streams.

The solid, olefin polymerization catalyst components of this invention are substantially uniform particles with good morphology and are active in polymerization of olefins especially stereoregular polymers of propylene. In addition to these advantageous properties, the catalyst particles can be manufactured in a relatively simple process which minimizes production of undesirable waste streams.

SUMMARY OF THE INVENTION

A solid, hydrocarbon-insoluble, olefin-polymerization catalyst component having substantially uniform particles useful in polymerizing olefins is formed by:

reacting a magnesium-containing compound with carbon dioxide or sulfur dioxide;

forming a two-phase mixture of the resulting magnesium-containing compound with a suitable liquid hydrocarbon-miscible phase and a suitable polar solvent phase;

forming particles by adding the two-phase mixture after vigorous agitation to a liquid hydrocarbon; and contacting the formed particles at least once with a transition metal halide in the presence of an electron donor.

BRIEF DESCRIPTION OF THE INVENTION

The olefin polymerization catalyst component of this invention comprises a particulate, hydrocarbon-insoluble, magnesium-containing, titanium-containing material typically which has been formed from an emulsion of a carbonated magnesium compound and which has been activated by treatment with an titanium (IV) compound and at least one electron donor compound.

The first step in preparing the preferred solid, hydrocarbon-insoluble catalyst component of this invention for the stereoregular polymerization or copolymerization of alpha-olefins comprises forming a solution of a magnesium-containing species which has been reacted with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is used, the magnesium-containing species is a hydrocarbyl carbonate or a carboxylate. When sulfur dioxide is employed, the resulting magnesium-containing species is an hydrocarbyl sulfite ($ROSO_2^-$) or an hydrocarbyl sulfinate ($RSO_2^-$).

Generally, magnesium hydrocarbyl carbonate is prepared by reacting carbon dioxide with a magnesium alcoholate. For example, magnesium hydrocarbyl carbonate is formed by suspending magnesium ethoxide in ethanol and adding carbon dioxide until the magnesium ethoxide dissolves forming magnesium ethyl carbonate. If, however, the magnesium ethoxide were suspended in 2-ethylhexanol, magnesium 2-ethylhexyl carbonate, magnesium ethyl carbonate and magnesium ethyl/2-ethylhexyl carbonate may be formed. If the magnesium ethoxide is suspended in a liquid hydrocarbon or halohydrocarbon which is free of alcohol, the addition of carbon dioxide results in the breaking apart of the magnesium ethoxide particles and the magnesium hydrocarbyl carbonate reaction product does not dissolve. The magnesium hydrocarbyl carbonate also can be formed as a solid/gas reaction between solid magnesium alkoxide and gaseous carbon dioxide. The reaction of a magnesium alcoholate with carbon dioxide can be represented as:

wherein n is a whole number or fraction up to 2, and wherein R is a hydrocarbyl group of 1 to 20 carbon atoms. Typically R is an alkyl radical of 1 to about 8 carbon atoms, an aryl radical of 6 to about 12 carbon atoms or an alkaryl or aralkyl radical of 7 to about 12 carbon atoms. Preferably R is a $C_2$–$C_5$ alkyl radical and most preferably is ethyl. In addition, a magnesium alcoholate-containing two different aforesaid hydrocarbyl groups may be employed.

Specific examples of magnesium alcoholates that are useful according to this invention include: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})$ $(OC_{18}H_{37})$. Mixtures of magnesium alcoholates also may be used if desired. Magnesium ethoxide is most preferred.

A suitable magnesium hydrocarbyl alcoholate has the formula MgR'(OR) wherein R' is as defined for R above. R and R' may be the same or different. When alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. However, when the suspending medium does not contain alcohol, the magnesium hydrocarbyl alcoholate reacts with carbon dioxide as:

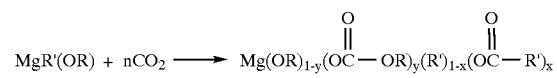

wherein $y+x=n \geq 2$ and $y=0$ for $x=n \leq 1.0$.
In the case of $y+n=2$,

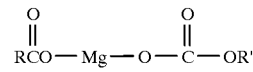

is the resulting magnesium-containing species.

When the magnesium compound from which the magnesium-containing species is formed is a hydrocarbyl magnesium compound having the formula XMgR, where X is a halogen and R is as defined above, the reaction of the hydrocarbyl magnesium compound with carbon dioxide forms a magnesium carboxylate and can be represented as follows:

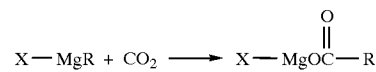

If the hydrocarbyl magnesium compound contains two hydrocarbyl groups, the reaction is represented as:

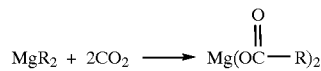

where R is as defined for X—MgR.

The hydrocarbyl magnesium compounds useful in this invention have the structure R—Mg—Q wherein Q is hydrogen, halogen or R' (as defined above). Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR_2$ wherein R is as defined above. In terms of catalytic activity and stereospecificity, best results are achieved through the use of hydrocarbyl magnesium halide compounds of the formula MgR'Q' wherein R' preferably is an alkyl radical of 1 to about 8 carbon atoms, an aryl radical of 6 to about 12 carbon atoms or an alkaryl or aralkyl radical of 7 to about 12 carbon atoms and Q' is chloride or bromide.

Most preferably, the magnesium-containing compound is a magnesium alcoholate, and the resulting magnesium-containing species is a magnesium hydrocarbyl carbonate.

For example, a magnesium alcoholate may be used which is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation. Use as the magnesium-containing compound of a magnesium alcoholate produced in this manner affords a solution of the magnesium-containing species which has a substantially reduced viscosity.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and the like; haloalkanes such as 1,1,2-trichloroethane, carbon tetrachloride, and the like; aromatics such as xylenes and ethylbenzene; and halogenated and hydrogenated aromatics such as chlorobenzene, o-dichlorobenzene, tetrahydronaphthalene and decahydronaphthalene.

In the process of forming the solid catalyst component of this invention, the carbonated magnesium-containing compound described above is placed into a solution with a polar solvent such as an alcohol. The solution of the magnesium-containing species typically comprises at least one monohydroxy alcohol containing from 1 to about 18 carbon atoms, preferably at a ratio of the total number of moles of the at least one alcohol to the number of moles of the aforesaid magnesium-containing compound in the range of from about 1.45:1, more preferably from about 1.6:1, to about 2.3:1, more preferably to about 2.1:1. Alcohols which are suitable for use in the present invention include those having the structure HOR" wherein R" is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as methanol, ethanol, 1- or 2-propanol, t-butyl alcohol, cyclohexanol, 2-ethylhexanol, amyl alcohols including isoamyl alcohol, and branched alcohols having 9 to 12 carbon atoms. A characteristic of such magnesium compound-containing solution is that it must form a two-phase system with a hydrocarbon-based liquid.

In a typical procedure, an emulsion is formed from an alcohol mixture of a magnesium alkyl carbonate and a hydrocarbon-miscible phase such as a light paraffinic hydrocarbon mineral oil, which has been agitated in a closed vessel. The resulting emulsion is added to a light liquid hydrocarbon, such as hexane or heptane, during which soft proto particles produced in the emulsion are solidified and hardened. The solidified particles are activated one or more times with a transition metal compound such as a titanium (IV) compound in the liquid phase (such as titanium tetrachloride) typically in the presence of an electron donor compound.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Typically, approximately 0.3 to 4 moles of $CO_2$ are added to the solution or suspension of the magnesium-containing compound with stirring at a temperature of about 0 to 100° C. over a period of approximately 10 minutes to 24 hours.

Alternatively, a solid magnesium-containing compound such as a magnesium alkoxide is contacted with sufficient gaseous carbon dioxide under pressure to form a magnesium hydrocarbyl carbonate.

In order to prepare the catalyst particles of this invention, an emulsion containing magnesium-containing product reacted with carbon dioxide as described above is formed by vigorous agitation of a two-phase mixture in which the magnesium compound is incorporated predominantly into one phase. The emulsion is precipitated to form substantially uniform particles by addition of the emulsion to a suitable liquid hydrocarbon. Use of carbonated magnesium compound in forming the emulsion in this invention leads to a more active and a better morphology controlled catalyst than an attempt to solubilize a magnesium halide.

Typically, such an emulsion is prepared by forming a mixture the carbon dioxide-reacted magnesium compound with a suitable hydrocarbon-miscible phase and a polar solvent phase such as one containing at least one alcohol. The hydrocarbon-miscible phase typically is a mineral oil, the viscosity of which has been adjusted by incorporation of a light liquid hydrocarbon. A suitable mixture useful in this invention will be a two-phase system in which the magnesium compound is incorporated into the polar layer. An emulsion is formed by vigorous agitation of this two-phase mixture. Optionally, a surfactant such as a suitable low HLB surfactant may be used in forming the emulsion.

Suitable alcohols (HOR") are described above. Although alcohols are the preferable solubilizing medium for the magnesium compound, other polar liquids, such as ketones, aldehydes, and the like, may be used if they do not react with the other materials present and can form a two-phase system with hydrocarbons. Preferably, methanol, ethanol, or a mixture of methanol and ethanol are used. A preferable alcohol mixture combines ethanol and methanol in which ethanol comprises about 25 to 75 vol. %, more preferably is about 30 to 50 vol. %, and most preferably about 40 vol. %. It has been observed that a larger proportion of ethanol typically produces a larger catalyst particle size.

Suitable mineral oils increase the viscosity of the two-phase system for better particle size control. Typical mineral oils are paraffinic hydrocarbon oils such as white oil and nujol. Other suitable mineral oils include silicone oils. Typical useful mineral oils have viscosities measured at 40° C. of 5 to 85 centistokes and, preferably, about 60 to 75 centistokes.

Addition of a light ($C_5$–$C_{12}$) liquid hydrocarbon such as hexane or heptane to the mineral oil decreases the viscosity of the oil phase. Adjustment of the oil-phase viscosity permits variation of the particle size of the catalyst particles. Typically, lower viscosity produces a larger catalyst particle size. However, if the oil-phase has a too low viscosity, the catalyst particles will not be stable and will break up. If the viscosity is too high, sufficient agitation will be difficult and solid particles will not form as fast. Also, the particle shape will not be round and uniform.

Agitation of the emulsion produces agglomeration of the magnesium-containing material and forms proto particles.

These proto particles solidify when the emulsion is contacted with a liquid hydrocarbon such as hexane or heptane. The size of the proto particles, and thereby the size of the resulting catalyst particles, will vary in relation with the agitation speed. Typically, higher agitation speeds will produce smaller particle sizes. Typical agitation speeds include 600 to 1200 rpm, which can produce particles in the 30 to 200 $\mu$m range. As known by persons skilled in the art, vessel dimension, agitation blade configuration, and speed of addition also may affect particle size. The temperatures at which the catalyst preparation procedures are conducted typically range from ambient to about 60° C.

The liquid hydrocarbon which is used to produce solid particles from the emulsion typically is a $C_5$ to $C_{12}$ hydrocarbon or mixtures thereof, and preferably is paraffinic. Preferable liquid hydrocarbons include hexane and heptane, although other liquid materials can be used if capable of forming a solid precipitate from the emulsion.

The catalyst component particles formed in accordance with this invention typically have particle sizes measured as $d_{50}$'s greater than 35 $\mu$m and preferably greater than 50 $\mu$m, and typically do not need sieving to remove small particles or fines. Polymers formed from catalyst components of this invention typically have few fines with polymer particles sizes ($d_{50}$) less than 150 $\mu$m and preferably few less than 250 $\mu$m.

Broadly, in accordance with this invention, the precipitated particles are treated with a transition metal compound and an electron donor. Suitable transition metal compounds which can be used for this purpose include compounds represented by the formula $T_a Y_b X_{c-b}$ wherein $T_a$ is a transition metal selected from Groups IV-B, V-B and VI-B of the Periodic Table of Elements, Y is oxygen, OZ or $NZ_2$; wherein each Z is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to the value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, and the like.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Typically, supported catalyst components useful for polymerizing propylene and higher olefins as well as for polymerizing propylene and higher olefins with a minor amount of ethylene contain an electron donor component as an internal modifier. Such internal modifier is an integral part of the solid supported component as is distinguished from an external electron donor component, which together with an aluminum alkyl component, comprises the catalyst system.

Typically, the external modifier and aluminum alkyl are combined with the solid supported component shortly before the combination is contacted with an olefin monomer.

Generally, organic electron donors have been described as useful in preparation of the stereospecific supported catalyst components including organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors have been described as useful in incorporating into supported catalyst components.

Examples of organic electron donors are described U. S. Pat. No. 5,227,354, incorporated by reference herein. Other examples of other electron donor systems include those described in U.S. Pat. Nos. 4,971,937, 5,068,213, 5,095,153, and 5,106,807, as well as published European application EP 0 452 156. These references generally describe classes of diethers useful as electron donor components. Other electron donors are described in U.S. Pat. Nos. 3,642,746, 4,186,107, 4,473,660, 4,522,930, 4,565,798, 4,693,990, 4,814,312, 4,829,034, and 4,904,628.

Internal electron donor materials are incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds. In addition, electron donor compounds may be added to the emulsion containing the magnesium compound before precipitation.

The particles formed as described above, the titanium halide component, and the electron donor components described in this invention are reacted at temperatures ranging from about –10° C. to about 170° C., preferably 70 to 95° C., generally over a period of several minutes to several hours, and are contacted in amounts such that the atomic ratio of titanium to magnesium components in the reaction mixture (calculated as magnesium in magnesium compound from which the magnesium-containing species is formed) is at least about 0.5:1. Preferably, this ratio ranges from about 0.5:1 to about 20:1. Greater amounts of titanium may be employed without adversely affecting catalyst component performance, but typically there is no need to exceed a titanium to magnesium ratio of about 20:1. More preferably, the titanium to magnesium ratio ranges from about 2:1 to about 15:1 to ensure that the catalyst components contain sufficient titanium to exhibit good activities without being wasteful of the titanium compound employed in preparation. The electron donor components are employed in a total amount ranging up from about 1.0 mole per gram atom of titanium in the titanium compound, and preferably from about 0.001 to about 0.6 mole per gram atom of titanium in the titanium compound. Best results are achieved when this ratio ranges from about 0.01 to about 0.3 mole per gram atom, of titanium.

Preferably, the aforesaid electron donor compounds and titanium compound is contacted with the precipitated solid particles in the presence of an inert hydrocarbon diluent, although other suitable techniques can be employed. Suitable diluents are substantially inert to the components employed and are liquid at the temperature and pressure employed.

A suitable diluent which can be used in any of the aforesaid steps should be substantially inert to the reactants employed and preferably is liquid at the temperatures and pressures used. A particular step may be conducted at an elevated pressure so that lower boiling diluents can be used at higher temperatures. Diluents may be hydrocarbon-based liquids such as aliphatic, substituted aliphatic, aromatic or substituted aromatic liquids. Although aromatic hydrocarbons, such as toluene, and substituted aromatics are useful, alkane diluents such as hexane and heptane are preferred if minimization of aromatic-containing waste streams is desired. Aromatic hydrocarbons, such as toluene may be useful if such material can be recycled in the manufacturing process. Also useful are higher boiling aliphatic liquids such as kerosene. Mixtures of diluents may be used. One useful diluent component is Isopar G® which is a $C_{10}$-average isoparaffinic hydrocarbon boiling at 156–176° C. Examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid preparative steps is conducted in the substantial absence of water, oxygen, carbon monoxide, and other extraneous materials capable of adversely affecting the performance of the catalyst or catalyst component of this invention. Such materials are conveniently excluded by carrying out the procedures in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation steps, there is obtained a solid reaction product suitable for use as a catalyst or catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance. Use of liquid hydrocarbons such as hexane or heptane is preferred to minimize halogenated waste streams.

Although not required, the final solid reaction product prepared may be contacted with at least one Lewis acid prior to polymerization. Such Lewis acids useful according to this invention are materials which are liquid or soluble in a liquid diluent at treatment temperatures and have a Lewis acidity high enough to remove impurities such as unreacted starting materials and poorly affixed compounds from the surface of the solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the final solid reaction product may be washed with an inert liquid hydrocarbon or halogenated hydrocarbon before contact with a Lewis acid. If such a wash is conducted, it is preferred to substantially remove the inert liquid prior to contacting the washed solid with Lewis acid. In an advantageous procedure, the precipitated particles are treated with titanium tetrachloride and then with titanium tetrachloride in the presence of one or more electron donors. More preferably, the product is treated one or more times with a liquid hydrocarbon such as hexane, heptane, or toluene and finally with titanium tetrachloride again.

The electron donor typically is a $C_2$–$C_6$ alkyl ester of a $C_5$–$C_{10}$ alkyl or aromatic acid and preferably is a dialkylphthalate wherein each alkyl group may be the same or different and contains from 3 to 5 carbon atoms. Preferably the second electron donor is an o-dialkylphthalate. The second electron donor is preferably a dibutylphthalate and more preferably is di-n-butylphthalate or di-i-butylphthalate.

Although the chemical structure of the catalyst or catalyst components of this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine.

In the solid catalyst component of this invention produced by the method of this invention, the atomic ratio of magnesium to titanium is at least about 0.3:1 and preferably, is from about 0.4:1 to about 20:1 and more preferably, from about 3:1 to about 9:1.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Typically, the catalyst or catalyst component of this invention is used in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. A magnesium, zinc, or aluminum alkyl containing 1 to about 6 carbon atoms per alkyl radical may be used. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, diethylaluminum hydride, diisobutylaluminum hydride, and the like.

A typical catalyst system for the polymerization or copolymerization of alpha olefins is formed by combining the supported titanium-containing catalyst or catalyst component of this invention and an alkyl aluminum compound as a co-catalyst, together with at least one external modifier which typically is an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

To optimize the activity and stereospecificity of this cocatalyst system, it is preferred to employ one or more modifiers, typically electron donors, and including compounds such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiY_4$, wherein each Y group is the same or different and is an alkyl or alkoxy group containing 1 to about 20 carbon atoms. Preferred silanes include isobutyltrimethoxysilane, diisobutyldimethoxysilane, diisopropyldimethoxysilane, dicyclohexyldimethoxysilane, dicyclopentyldimethoxysilane, diphenyldimethoxysilane, di-t-butyldimethoxysilane, and t-butyltrimethoxysilane.

The catalyst or catalyst component of this invention is useful in the stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 30 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

Typically, a catalyst or catalyst component of this invention is used in amounts ranging from about 0.2 to 0.01 (preferably 0.1 to 0.02) milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0 to about 120° C. with a range of from about 20° C. to about 95° C. being preferred from the standpoint of attaining good catalyst performance and high production rates. More preferably, polymerization according to this invention is carried out at temperatures ranging from about 500° C. to about 80° C.

Alpha-olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydronaphthalene, decahydronaphthalene; high molecular weight liquid paraffins or mixtures thereof, and other well-known diluents. It often is desirable to purity the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; 4,003,712; 4,326,048; 4,337,069; 4,535,134; 4,569,809; 4,610,574; 4,640,963; 4,708,787; 5,209,607; and 5,504,166, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one, or more valve controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLES

A series of supported catalyst components were prepared according to this invention.

Formation of Magnesium Ethyl Carbonate

A 100-milliliter Fisher-Porter pressure bottle containing 11.4 grams (0.1 mole) of magnesium ethoxide was charged with 30 psig (207 kPa,gauge) carbon dioxide for one hour resulting in 19.8 grams of magnesium ethyl carbonate.

Formation of Solid Particle Support

Procedure A

In a 500-milliliter round-bottom flask equipped with a mechanical stirrer were placed 19.8 grams of magnesium ethyl carbonate in 40 milliliters of hexane, 11.0 milliliters of methanol, and 7.0 milliliters of ethanol. After mild agitation for about 10 to 15 minutes, two phases formed in which the hydrocarbon was the top layer and the dissolved magnesium compounds in the alcohols was the bottom layer. To this mixture, 100 milliliters of mineral oil (Amoco® white oil #35; viscosity: 69.3 centistokes @ 40° C.) were added and the resulting mixture agitated vigorously at about 1200 rpm. The agitated mixture was added over about 60 seconds to a second flask containing 1500 milliliters of hexane with moderate stirring. Precipitation of particles was immediate. The resulting slurry of solid particles was stirred for an additional 10 to 15 minutes, allowed to settle, most of the hexane decanted, and the solids filter dried.

Procedure B

In a 500-milliliter round-bottom flask equipped with a mechanical stirrer were placed 19.8 grams of magnesium ethyl carbonate in 40 milliliters of hexane, 0.21 grams of $ZnCl_2$, 11.0 milliliters of methanol, and 7.0 milliliters of ethanol. After mild agitation for about 15 to 20 minutes, two phases formed in which the hydrocarbon is the top layer and the dissolved magnesium and zinc compounds in the alcohols was the bottom layer. To this mixture, 100 milliliters of mineral oil (Amoco® white oil #35; viscosity: 69.3 centistokes @ 40° C.) was added and the resulting mixture agitated vigorously at about 1200 rpm. The agitated mixture was added over about 60 seconds to a second flask containing 1500 milliliters of hexane with moderate stirring. Precipitation of particles was immediate. The resulting slurry of solid particles was stirred for an additional 10 to 15 minutes, allowed to settle, most of the hexane decanted, and the solids filtered dried.

Formation of Titanium-Containing Component

Several procedures were used to form the titanium-containing component as described below.

A. The precipitated solid (19 grams) was transferred to a one-liter reactor and washed twice with heptane. After decantation, 100 milliliters of titanium tetrachloride were added and the mixture was agitated at 450 rpm for 90 minutes at 115° C. After stirring was stopped, the resulting solid was allowed to settle, the supernatant was decanted, and 100 milliliters of titanium tetrachloride were added to the solids and mixed for a few minutes until the temperature was between 95–100° C. To this mixture, 2.5 milliliters of di-n-butylphthalate were added and mixing was continued at 450 rpm at 115° C. for 90 minutes. The solid was allowed to settle and supernatant liquid was decanted. An additional 100 milliliters of titanium tetrachloride were added, the mixture heated at 100° C. under agitation for 30 minutes, after which the agitation was stopped, and the supernatant liquid was decanted. The residue was washed five times with 100-milliliter portions of hexane and the solids recovered.

B. Precipitated solid (19 grams) was transferred to a one-liter reactor and washed twice with heptane. After decantation, 100 milliliters of titanium tetrachloride were added and the mixture was agitated at 450 rpm for 60 minutes at 110° C. After stirring was stopped, the resulting solid was allowed to settle, the supernatant was decanted, and 100 milliliters of titanium tetrachloride were added to the solids and mixed for a few minutes until the temperature was between 95 and 100° C. To this mixture, 2.5 milliliters of di-n-butylphthalate were added and mixing was continued at 450 rpm at 120° C. for 90 minutes. The temperature of the mixture was allowed to decrease to 77° C. and mixing was continued for 60 minutes. The solid was allowed to settle and supernatant liquid was decanted. After settling and decantation, an additional 100 milliliters of titanium tetrachloride were added, the mixture heated at 100° C. under agitation for 45 minutes, after which the agitation was stopped, and the supernatant liquid was decanted. The residue was washed five times with 100-milliliter portions of hexane and the solids recovered.

C. Precipitated solid (30 grams) was transferred to a one-liter reactor and was washed twice with heptane. After decantation, 100 milliliters of toluene and 12 milliliters of titanium tetrachloride were added slowly at ambient temperature and mixed for two minutes. To this mixture, 2.5 milliliters of di-n-butylphthalate were added and mixing was continued at ambient temperature for 60 minutes. To this mixture, 150 milliliters of toluene and 75 milliliters of titanium tetrachloride were added and heated to 115° C. for 120 minutes with agitation at 600 rpm. The solid was allowed to settle and supernatant liquid was decanted. The solid was washed twice for five minutes with 100-milliliter portions of toluene. After settling and decantation, an additional 200 milliliters of toluene and 75 milliliters of titanium tetrachloride were added, and the mixture heated at 95° C. under agitation for 60 minutes. After agitation was stopped and supernatant liquid decanted, the residue was washed five times with 1200-milliliter portions of hexane and the solids recovered.

D. Precipitated solid (10 grams) was suspended in 200 milliliters of heptane and transferred to a one-liter reactor. After decantation, 150 milliliters of toluene and 50 milliliters of titanium tetrachloride were added and the mixture was agitated at 600 rpm for 120 minutes at 115° C. After stirring was stopped, the resulting solid was allowed to settle, the supernatant was decanted, and 150 milliliters of toluene and 50 milliliters of titanium tetrachloride were added to the solids and mixed for a few minutes until the temperature was between 95 and 100° C. To this mixture, 1.25 milliliters of di-n-butylphthalate were added and mixing was continued at 600 rpm for 120 minutes. The solid was allowed to settle, supernatant liquid was decanted, and 100 milliliters of toluene were added and mixed for 30 minutes at 95° C. After settling and decantation, an additional 100 milliliters of titanium tetrachloride were added, the mixture heated at 95° C. under agitation for 30 minutes, after which the agitation was stopped, and the supernatant liquid was decanted. The residue was washed five times with 100-milliliter portions of hexane and the solids recovered.

Bulk Polymerization

Batch bulk phase propylene polymerizations were performed in a two-liter reactor equipped with a mechanical stirrer which had been purged with nitrogen for at least 30 minutes before replacing the nitrogen with a propylene atmosphere. A sufficient amount (approximately 29 millimoles) of hydrogen was added to target a polymer melt flow rate of 5 dg/min. At ambient temperature, solid catalyst component (10 milligrams), triethylaluminum, and diisobutyldimethoxysilane (Al/Si/Ti molar ratio=300/30/1) were added with 1.34 liters of propylene with agitation at 500 rpm, and the mixture heated to 71° C. The heater was turned off and the reactor vented one hour after the addition of propylene. The resulting polymer was removed from the reactor and dried in a vacuum oven at 77° C. for two hours at a pressure of approximately 330 mm Hg (44 kPa).

Results

The conditions employed and results obtained are summarized in Table 1. In Table 1, "Yield" (grams of polymer produced per gram of solid catalyst component) was based on the weight of solid catalyst used to produce polymer. "Extractables" were determined by measuring the loss in weight of a dry sample of ground polymer after being extracted in boiling n-hexane for three to six hours and are reported as the weight percent (wt. %) of the solid polymer removed by the extraction. The bulk density (BD) is reported in units of grams per milliliter. The viscosity of the solid polymer was measured according to ASTM D1238L (2.16 kg @ 230° C.) and reported as the melt flow rate (MFR) in grams of polymer per 10 minutes.

Data for Examples 1–20 and Comparative Run A are shown in Table 1.

TABLE 1

| Example (Run) | Yield (kgPP/ gcat) | Ext. (wt. %) | Bulk Den (g/ml) | MFR (g/10 min.) | Catalyst Particle Size Distribution (PSD) | | | Type Supt./ Act.[1] |
|---|---|---|---|---|---|---|---|---|
| | | | | | $d_{10}$ | $d_{50}$ | $d_{90}$ | |
| 1  | 20.9 | 2.27 | 0.444 | 1.4 | 12.6 | 29.3 | 50.2  | A/A |
| 2  | 29.8 | 3.63 | 0.425 | 3.3 | 28.7 | 50.3 | 71.4  | A/A |
| 3  | 19.6 | 2.43 | 0.396 | 0.7 | 20.4 | 56.5 | 108.1 | A/A |
| 4  | 28.5 | 0.78 | 0.378 | 0.6 | 56.2 | 93.2 | 128.7 | A/A |
| 5  | 13.9 | 1.76 | 0.417 | 2.8 | 18.1 | 36.6 | 57.5  | A/B |
| 6  | 20.8 | 2.95 | 0.316 | 2.3 | 19.3 | 37.2 | 56.7  | A/B |
| 7  | 13.4 | 2.53 | 0.428 | 4.5 | 15.9 | 37.2 | 63.9  | A/B |
| 8  | 22.9 | 2.94 | 0.429 | 2.2 | 54.9 | 86.9 | 116.3 | A/B |
| 9  | 12.1 | 1.15 | 0.423 | 4.2 | 22.1 | 43.4 | 66.6  | A/C |
| 10 | 30.4 | 2.19 | 0.428 | 9.3 | 20.5 | 44.3 | 72.4  | A/C |
| 11 | 22.4 | 2.16 | 0.451 | 0.9 | 12.3 | 46.3 | 108.1 | A/C |
| 12 | 17.1 | 0.77 | 0.396 | 2.3 | 2.2  | 23.2 | 42.3  | A/C |
| 13 | 27.5 | 1.91 | 0.441 | 0.7 | 11.2 | 28.7 | 52.4  | A/D |
| 14 | 33.0 | 2.17 | 0.444 | 1.0 | 15.7 | 32.0 | 50.4  | A/D |
| 15 | 35.0 | 2.43 | 0.432 | 4.5 | 17.9 | 37.4 | 59.8  | A/D |
| 16 | 28.7 | 0.77 | 0.413 | 0.3 | 24.3 | 41.5 | 67.6  | A/D |
| 17 | 32.5 | 1.09 | 0.407 | 3.2 | 16.9 | 46.7 | 89.3  | A/D |
| 18 | 20.6 | 2.16 | 0.456 | 1.6 | 13.1 | 29.6 | 49.8  | B/A |
| 19 | 29.1 | 1.73 | 0.435 | 3.2 | 13.5 | 29.1 | 47.5  | B/D |
| 20 | 26.9 | 2.1  | 0.465 | 1.9 | 9.6  | 23.7 | 42.0  | B/D |
| A  | 25.7 | 2.7  | 0.411 | 6.0 | 10.7 | 20.0 | 29.9  | 2 |

[1]Support type and Activation type as described above.
[2]Catalyst component prepared according to U.S. Pat. No. 4,866,022.

What is claimed is:

1. A process to a form solid, hydrocarbon-insoluble, olefin-polymerization catalyst component useful in polymerizing olefins comprising:

reacting a magnesium-containing compound with carbon dioxide or sulfur dioxide;

forming a two-phase mixture of the resulting magnesium-containing compound with a suitable liquid hydrocarbon-miscible phase and a suitable polar solvent phase;

forming particles by adding the two-phase mixture after vigorous agitation to a liquid hydrocarbon; and contacting the formed particles at least once with a transition metal halide in the presence of an electron donor.

2. The process of claim 1 in which the magnesium-containing compound is a magnesium alcoholate and is reacted with carbon dioxide.

3. The process of claim 1 which the hydrocarbon-miscible phase comprises a mineral oil.

4. The process of claim 1 in which the polar solvent phase comprises at least one alcohol.

5. The process of claim 1 in which an electron donor is incorporated into the two-phase mixture prior to particle formation.

6. The process of claim 1 in which the formed particles are contacted at least once with titanium tetrachloride in an hydrocarbon diluent.

7. The process of claim 1 in which the electron donor comprises a dialkylphthalate wherein each alkyl group contains from 3 to 5 carbon atoms.

8. The process of claim 4 in which the alcohol is a $C_1$–$C_5$ monohydroxy alcohol or mixtures thereof.

9. A process to form a solid, hydrocarbon-insoluble, olefin-polymerization catalyst component useful in polymerizing olefins comprising:

forming a two-phase mixture comprising (i) a magnesium alkyl carbonate contained in a solvent phase comprising at least one alcohol and (ii) a hydrocarbon-miscible phase comprising a suitable mineral oil combined with a light liquid hydrocarbon;

forming an emulsion by vigorous agitation of the two-phase system;

precipitating particles by adding the emulsion to a liquid hydrocarbon; and contacting the precipitated particles at least once with a transition metal halide in the presence of an electron donor.

10. The process of claim 9 in which the magnesium alkyl carbonate is magnesium ethyl carbonate.

11. The process of claim 10 in which the mineral oil has a viscosity of about 5 to 85 centistokes at 40° C.

12. The process of claim 11 in which the mineral oil is a white oil.

13. The process of claim 12 in which the alcohol is a $C_1$–$C_5$ monohydroxy alcohol or mixtures thereof.

14. The process of claim 13 in which an electron donor is incorporated into the two-phase system prior to precipitation.

15. The process of claim 3 in which the magnesium alkyl carbonate is formed by reacting a magnesium alcoholate with carbon dioxide.

16. A process to form a solid, hydrocarbon-insoluble, olefin-polymerization catalyst component useful in polymerizing olefins comprising:

forming a two-phase mixture comprising (i) magnesium ethyl carbonate contained in a solvent phase comprising at least one alcohol selected from the group consisting of $C_1$–$C_8$ monohydroxy alcohols and (ii) a hydrocarbon-miscible phase comprising a suitable mineral oil combined with a liquid hydrocarbon selected from the group consisting of $C_5$–$C_{12}$ alkanes;

forming an emulsion by vigorous agitation of the two-phase system;

precipitating particles by adding the emulsion to a liquid hydrocarbon selected from the group consisting of $C_5$–$C_8$ alkanes; and contacting the precipitated particles at least once with titanium tetrachloride in the presence of an electron donor comprising a dialkylphthalate wherein each alkyl group contains from 3 to 5 carbon atoms.

17. The process of claim 16 in which the two-phase system is formed from a liquid hydrocarbon selected from the group consisting of hexane, heptane, and mixtures thereof and an alcohol selected from the group consisting of methanol, ethanol, and mixtures thereof.

18. The process of claim 16 in which the liquid hydrocarbon is hexane or heptane and the alcohol is a mixture of methanol and ethanol.

19. The process of claim 16 wherein the alcohol phase comprises a mixture of methanol and ethanol wherein ethanol comprises about 25 to 75 volume percent of the mixture.

20. The process of claim 16 in which the mineral oil is white oil or silicone oil.

* * * * *